United States Patent Office 2,754,875
Patented July 17, 1956

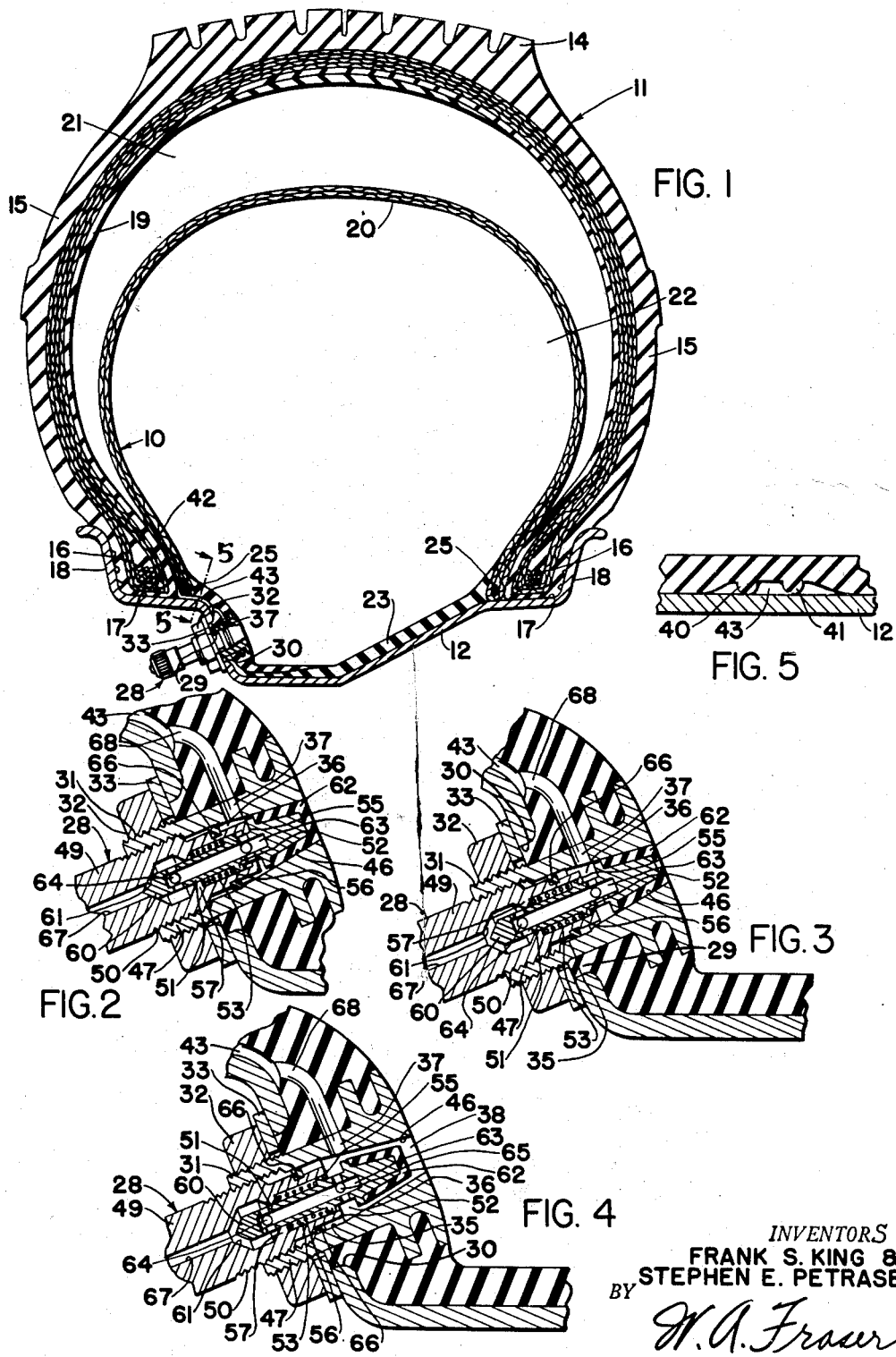

2,754,875

TUBELESS TIRE

Frank S. King and Stephen E. Petrasek, Akron, Ohio, assignors to The Firestone Tire & Rubber Company, Akron, Ohio, a corporation of Ohio Application February 24, 1953, Serial No. 338,322

1 Claim. (Cl. 152—341)

This invention relates to tubeless tires and more particularly to improved safety members adapted to provide blowout protection for such tires.

The co-pending application of King and Coben, Serial No. 194,129, now Patent Number 2,713,371, points out the advantages of safety members for tubeless tires and describes the construction of one such safety member which has enjoyed commercial success. Such members as the King and Coben diaphragm, divide the interior of a tire into two compartments so that in the event of a blowout, with the explosive release of air from the outer compartment, air is nevertheless retained within the inner compartment to give support to the blowout tire and enable the driver to retain control of the car.

An objection to the King and Coben diaphragm is that a specially molded tire is required to secure and position the safety diaphragm properly therein. The present invention avoids this objection by providing a safety member which can be used with any tubeless tire of conventional construction. The member takes the form of a small complete tube having an outer portion of substantially inextensible, rubberized fabric extending outwardly from two inextensible beads which are seated on the rim of the tire. The outer portion is spaced from the interior walls of the tire to define an outer compartment therewith. A rubber portion connecting the beads and adapted to lie adjacent the rim completes the tubular form of the member. The interior of the tube comprises the inner compartment and means is also provided to ensure an air pressure within the tube which is somewhat higher than the pressure in the outer compartment.

This construction has many advantages. The complete tubular form provides ease of mounting and eliminates all the troubles of inflating which are ordinarily encountered in inflating tubeless tires. The inextensible beads secure the tube against bodily displacement of the tire and limit the distention of the tube during inflation. The differential pressure in the tube overcomes any problem which otherwise might result from the centrifugal forces of operation. An effective, easily manufactured, safety member is thus provided which does not require a specially molded tire.

It is accordingly a general object of the invention to provide a safety member which can be used with conventional tubeless tires and which does not require any special molded features in the tire or any other special accessories.

Another object is to provide effective means for dividing a tire into two compartments and for maintaining a higher air pressure in the inner compartment thereof.

Another object is to provide a tubular safety member for tubeless tires in which the air pressure within the tube is maintained higher than in the remainder of the tire to give added security in the event of a blowout without sacrificing the comfort of and the other qualities of ride of the tire.

Another object is to provide a safety member for tubeless tires which can be securely positioned within the tire and which will retain its balance and stability so as to enable the tire to run smoothly without objectionable vibration.

Another object is to provide a safety member for tubeless tires which can effectively resist the centrifugal forces of operation so as to maintain its position within the tire.

Another object is to provide a safety member for tubeless tires which is easy to mount and inflate and which enables the tubeless tire itself to be more easily mounted and inflated.

Another object is to provide a safety member for tubeless tires having novel and effective means to lead air from the inflation valve to the outer compartment, said means being defined by the inner wall of the tire and the outer wall of the tubular member.

Another object is to provide an improved valve for inflating a tubeless tire and safety member.

Another object is to provide an inflation valve adapted to produce a differential pressure between the two compartments defined by the tubeless tire and a safety member positioned in the tire.

Yet another object is to provide a safety member for tubeless tires which is cheap and easy to manufacture.

Further objects and advantages will be more fully apparent from the following description of a preferred form of the invention, reference being had to the accompanying drawings in which:

Figure 1 is a transverse radial section of a tubeless tire mounted on a drop-center rim assembled with a safety member embodying the invention;

Figure 2 is a view of the inflation valve of Figure 1 on an enlarged scale to show more clearly the construction thereof, the valve being shown in closed position;

Figure 3 is a view of the valve of Figure 2 showing the valve in position to admit air to the outer compartment only; and Figure 4 is a view of the valve of Figures 2 and 3 showing the valve in position to admit air to both compartments of the tire, i. e. to the space within the tubular safety member and also to the space defined by the outer walls of the tube and the inner walls of the tire; and Figure 5 is a fragmentary section of a portion of the assembly of Figure 1 taken in the plane indicated by the lines 5—5 of Figure 1.

Now referring to the drawings, the invention is shown embodied in a tubular safety member, indicated generally at 10, which is assembled with a conventional tubeless tire 11 mounted on a drop center rim 12. The details of construction of the tire need not be described for they are well known to those skilled in the art. It is sufficient to say that the tire has the usual tread 14, sidewalls 15 and beads 16 which are seated on the rim surfaces 17 adjacent the flanges 18 of the rim. An impervious lining 19 of butyl rubber serves to retain air within the tire.

The safety member is in the form of a complete tube comprising a substantially in extensible outer portion 20 of two plies of bias-laid rubberized fabric which extends outwardly to divide the interior of the tire into an outer compartment 21 and an inner compartment 22. An inner portion 23 of extensible material, preferably rubber, but alternatively of single-ply rubberized fabric having cords extending at an angle of 45° lies adjacent the rim and completes the tubular form of the safety member. The tube is reinforced by a pair of identical beads 25 located at the juncture of the portions 20 and 23. Preferably the plies of portion 20 are wrapped about and thus securely anchored to the beads 25.

The beads 25 are adapted to seat snugly on the rim surfaces 17 adjacent the tire beads 16 and preferably have a diameter 0.005–0.010 inch smaller than the diameter of the surfaces 17 so that they will be under an appreciable tension when so seated. The beads 25 thus give a stability to the tube 10, preventing any shifting or bodily displacement of the tube and also restricting the distention of the extensible tube portion 23 when the tube is inflated.

The tire is inflated by means of an inflation valve 28 secured to the portion 23 and having a stem 29 adapted to protrude through a hole 30 in the wall of the drop center rim 12. The valve stem is externally threaded as indicated at 31 to receive a nut 32 which when screwed down tight compresses a washer 33 and seals the aperture 30. The nut also tends to hold the valve 28 securely in the proper position, although, as noted above, there is little tendency for the tube and its valve to shift position in the tire.

A feature of the invention is the provision of a somewhat higher air pressure within the tube 10, i. e. within the inner compartment 22, than in the outer compartment 21. Such a difference in pressure has a number of advantages. It tends to hold the beads 25 securely on the seats 17, overcoming any tendency on the part of the beads to slip axially inwardly into the well of the rim. is the added support which a higher pressure in the tube It also forces the portion 23 firmly against the rim, successfully opposing the tendency of the rubber to throw outwardly due to centrifugal force. Of equal importance will give in the event of a blowout, without sacrificing the quality of the ride of the tire under normal operation.

This differential pressure is obtained by means of the special construction of the inflation valve 28. It will be noted that the valve has a bore 35 extending from the open end of the valve stem and communicating with a chamber 36 in the base of the valve. The chamber 36 has two outlet orifices 37 and 38 leading respectively to the outer compartment 21 and to the interior 22 of the tube.

The outer wall of the tube 10 immediately adjacent the orifice 37 has a special configuration to permit air to pass readily from the orifice 37 between the tube 10 and rim 12 to the outer compartment without being trapped. Preferably, this configuration takes the form of two closely spaced ribs 40 and 41 leading from the base of the valve to a point 42 outside of one of the beads 25. The ribs define a channel 43 which permits the ready passage of air to the outer chamber. As an alternate construction, only one rib may be used and in this case the air will pass along the channels along both sides the base of the rib, or a single groove might be used to provide for the passage of air.

The valve 28 has a construction which enables air to be passed at the option of the user through the outlet orifices into either the outer compartment alone or into both compartments simultaneously. Thus, the bore 35 has a tapered conical seat 46 adjacent the orifice 38 and has an internally threaded portion 47 at the outer end of the stem. The core of the valve comprises an outer tubular portion 49 having threads 50 which engage threads 47 of the stem which is coupled to an inner portion 51.

The parts 49 and 51 have a limited telescoping movement relative to each other which is permitted by the sliding movement of a flange 52 of part 51 within the counterbore 53 of part 49. After the two parts are assembled, the end of part 49 is peened under to form a slight flange 55 which holds the parts permanently together. A coil spring 56 is confined within the bore 53 between the flange 52 and the bottom face 57 of the bore 53 and is compressed to urge the parts 49 and 51 towards their most widely separated position, which is shown in Figure 4.

The inner part 51 is of tubular construction with a conical tip 60, adapted to cooperate with a valve seat 61 in the part 49 to control the flow of air through the valve. Part 51 has a conical tip 62 which is adapted to cooperate with the seat 46, to control the flow of air into the inner compartment 22. The part 51 has a central passage 63 and a plurality of ports 64 and 65 to give access to the central passage.

When the part 49 is turned down to its fully closed position the valve parts have the relationship shown in Figure 2, with the part 51 telescoped fully within the part 49 and with the conical parts 60 and 62 seated upon the corresponding seats 61 and 46, respectively, so as to close off completely the passage of air through the valve. A gasket 66 seals against the bore of the valve to ensure that no leakage will take place through the threads 47 and 50. In this position the coil spring 56 is fully compressed. When the part 49 is withdrawn by giving it a full turn in the threads 47, the parts 49 and 51 will separate slightly, so that the tip 60 will be lifted from its seat 61, but the conical tip 62 will still close the passage to the inner compartment. Air can pass into the valve through the central passage 67, through the valve comprising parts 60 and 61, through the ports 64, the central passage 63 and the ports 65 into the chamber 36. The air then passes from the chamber 36 through a short passage 68 in the base of the stem, into the passage 43 between the ribs 41 and 42 and finally into the outer chamber.

When the part 49 is withdrawn still further, flanges 52 and 55 will engage and the inner part 51 will be withdrawn bodily until the tip 62 is removed from the seat 46, see Figure 4. In this position of the valve parts air can pass into both chambers simultaneously.

In use, the safety tube 10 is placed within the tire and the tire and tube are simultaneously mounted on the rim, taking advantage of the well of the drop center rim in the usual manner. One of the beads 16 of the tire and the corresponding bead 25 of the tube are seated manually on one of the rim seats. The valve stem 29 is forced through the hole of the rim and the compression nut 32 tightened down on the washer. The valve core is adjusted to the position of Figure 4 and air is passed into both chambers until they hold 30 pounds of air. The valve is turned to the position of Figure 3 and air is withdrawn from the outer compartment until it holds 25 pounds of air. The valve is then tightened to the full closed position of Figure 2 to retain the air in both compartments.

As the tube is inflated, the fabric portion 20 tends to move radially outwardly and since one of the beads 25 is anchored on its rim seat 17, the fabric tends to swing around this bead as a pivot with the other bead 25 swinging axially outwardly until it too seats on its rim seat. As this takes place, the other tire bead 16 is also forced into its proper position on the rim seat and against the rim flange. There is thus no difficulty in mounting and inflating the tire for inflation of the tube will automatically ensure the proper positioning of the tire on the rim.

If the tire should blowout, with the loss of air from the outer compartment 21, the tube 10 will still retain air and the tire will be supported by the safety tube 10 until the car can be safely brought to a stop.

If desired, a stretchable plastic film may be substituted for the rubber portion 23 or, as pointed out above, fabric having a suitable bias angle may be used. The preferred bias angle is 45° but other bias angles will be suitable as is well known to those skilled in the art.

While one particular valve has been shown which will produce a differential pressure between the two compartments, it will be obvious that other valves of suitable construction may be used. It is essential, however, that the valve be secured to the tube adjacent the rim rather than be located in and secured to the outer fabric portion 20 of the safety member such as is shown in the prior art. If the differential pressure valve is secured to the fabric portion of the safety member, its weight will throw it appreciably out of balance. Moreover, a valve which is secured directly to the outer portion of the safety member tends to be sensitive to centrifugal force and, depending on the design, its function and operation may be seriously impaired. In addition, such a construction makes deflation of the tire awkward and difficult.

Various other modifications will occur to those skilled in the art without departing from the spirit and scope of the invention, the essential features of which are summarized in the claim below.

What is claimed is:

In combination, a tubeless tire, a drop center rim and a tubular safety member mounted in said tire adjacent said rim, said tubular safety member comprising a substantially inextensible, air-impervious, flexible portion extending from bead to bead of the tire to divide the interior of the tire into an inner compartment comprising the interior of said tube, and an outer compartment defined by the outer wall of said tube and the inner wall surfaces of said tire, said inextensible portion terminating in beads seated snugly on the rim surfaces of the rim adjacent the bead portions of said tire; the tubular form of said member being completed by an inner portion lying adjacent said rim and extending from one of said beads to the other, an inflation valve secured to said inner portion and extending through the rim and sealed with respect to said rim to retain air within said tire, said inflation valve having passages communicating respectively with the interior of said tube and with said outer compartment and having valve members closing off said passages selectively to inflate one of said compartments independently of the other compartment and to provide a higher air pressure in said tubular member than in said outer compartment.

References Cited in the file of this patent

UNITED STATES PATENTS

| 2,549,075 | Fox | Apr. 17, 1951 |
| 2,554,815 | Church | May 29, 1951 |
| 2,608,235 | Wyman | Aug. 26, 1952 |

FOREIGN PATENTS

| 658,465 | Great Britain | Oct. 10, 1951 |